(12) United States Patent
Heistand, II et al.

(10) Patent No.: US 7,643,303 B1
(45) Date of Patent: Jan. 5, 2010

(54) ROTATING AND TRANSLATING CONTROL PANEL

(75) Inventors: Raymond DeWine Heistand, II, Round Rock, TX (US); Richard Daniel Trotta, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 12/363,105

(22) Filed: Jan. 30, 2009

(51) Int. Cl.
*G06F 1/16* (2006.01)
(52) U.S. Cl. .................................. 361/724; 361/755
(58) Field of Classification Search .............. 361/725
See application file for complete search history.

(56) References Cited

U.S. PATENT DOCUMENTS

| | | | |
|---|---|---|---|
| 5,169,218 A | 12/1992 | Chu | |
| 5,450,285 A * | 9/1995 | Schlemmer | ............. 361/724 |
| 5,724,227 A * | 3/1998 | Hancock et al. | ........ 361/679.32 |
| 5,748,442 A * | 5/1998 | Toor | ............. 361/679.31 |
| 5,796,492 A | 8/1998 | Reifenstein | |
| 6,122,173 A * | 9/2000 | Felcman et al. | ............. 361/726 |
| 6,618,247 B2 * | 9/2003 | Felcman et al. | .......... 361/679.6 |
| 7,062,197 B2 | 6/2006 | Kunugi | |
| 7,515,429 B1 * | 4/2009 | Schmidt et al. | ............. 361/727 |
| 2006/0039122 A1 * | 2/2006 | Yen | ............. 361/724 |
| 2006/0077624 A1 | 4/2006 | Lin | |
| 2008/0084146 A1 * | 4/2008 | Wang | ............. 312/223.2 |
| 2008/0180887 A1 * | 7/2008 | Hauser | ............. 361/679 |

* cited by examiner

*Primary Examiner*—Jayprakash N Gandhi
*Assistant Examiner*—Anthony Q Edwards
(74) *Attorney, Agent, or Firm*—Haynes and Boone, LLP

(57) ABSTRACT

A rotating control panel system includes a base. A control panel is coupled to the base by a coupling. The coupling includes a pivot axis having an elongated pivot aperture and a pivot member located in the elongated pivot aperture. The pivot member is operable to rotate relative to the elongated pivot aperture and translate relative to the elongated pivot aperture. The coupling also includes a translation cam having an arcuate translation channel and a translation member located in the arcuate translation channel. In response to the control panel being rotated relative to the base, the pivot member rotates relative to the elongated pivot aperture, and the translation member moves relative to a first portion of the arcuate translation channel to cause the pivot member to translate relative to the elongated pivot aperture in a first direction in order to translate the control panel relative to the base in the first direction, and then moves relative to a second portion of the arcuate translation channel to cause the pivot member to translate relative to the elongated pivot aperture in a second direction in order to translate the control panel relative to the base in the second direction, wherein the second direction is opposite the first direction.

20 Claims, 13 Drawing Sheets

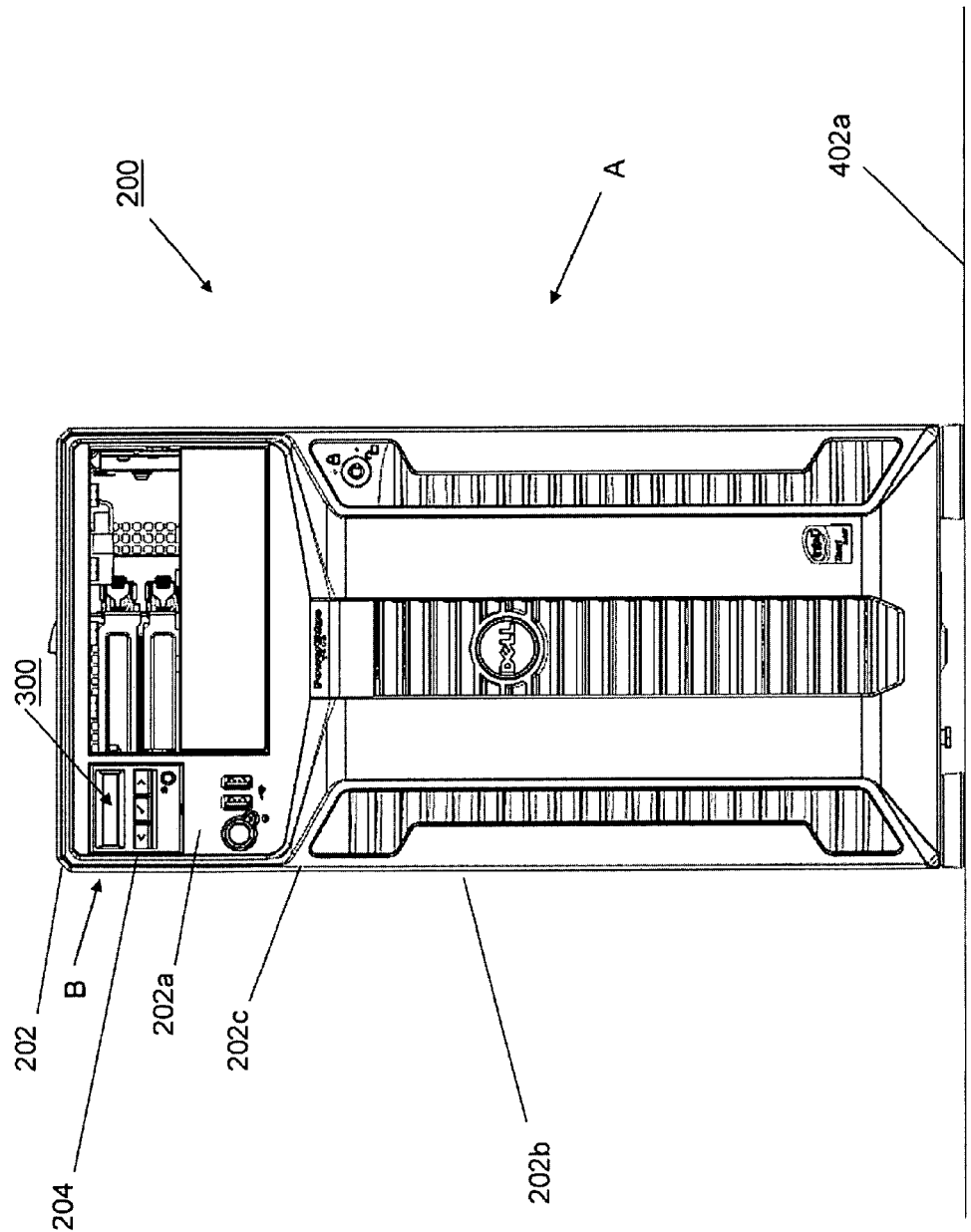

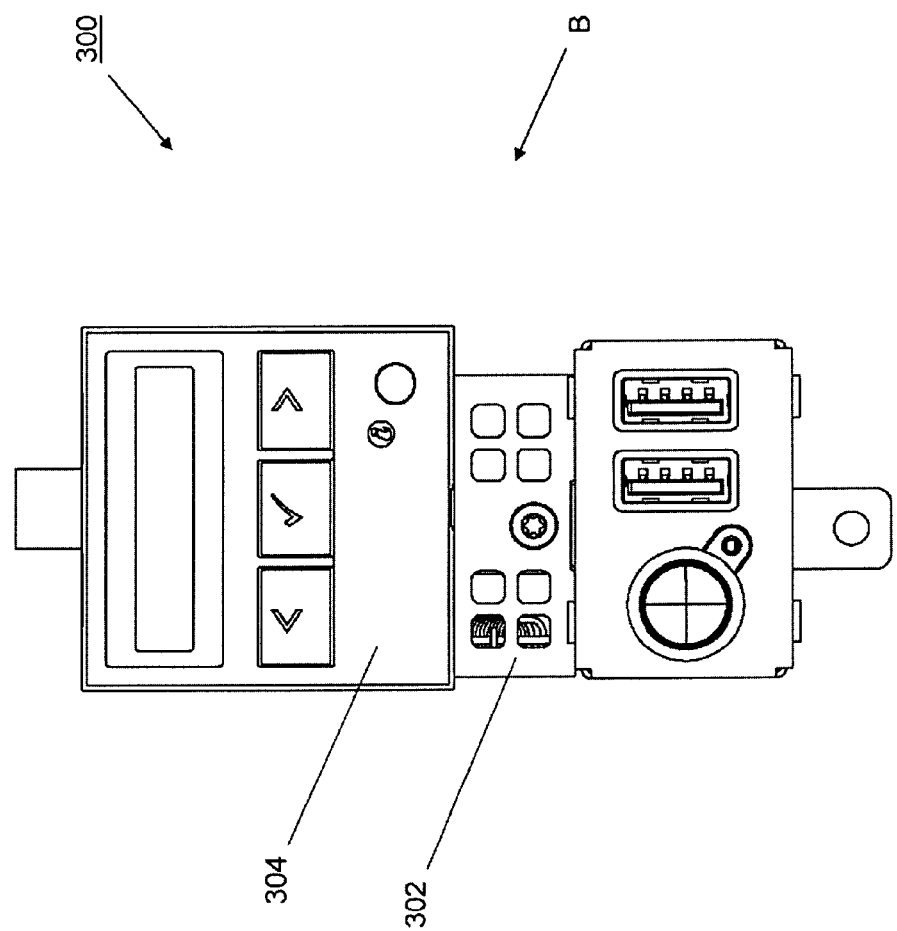

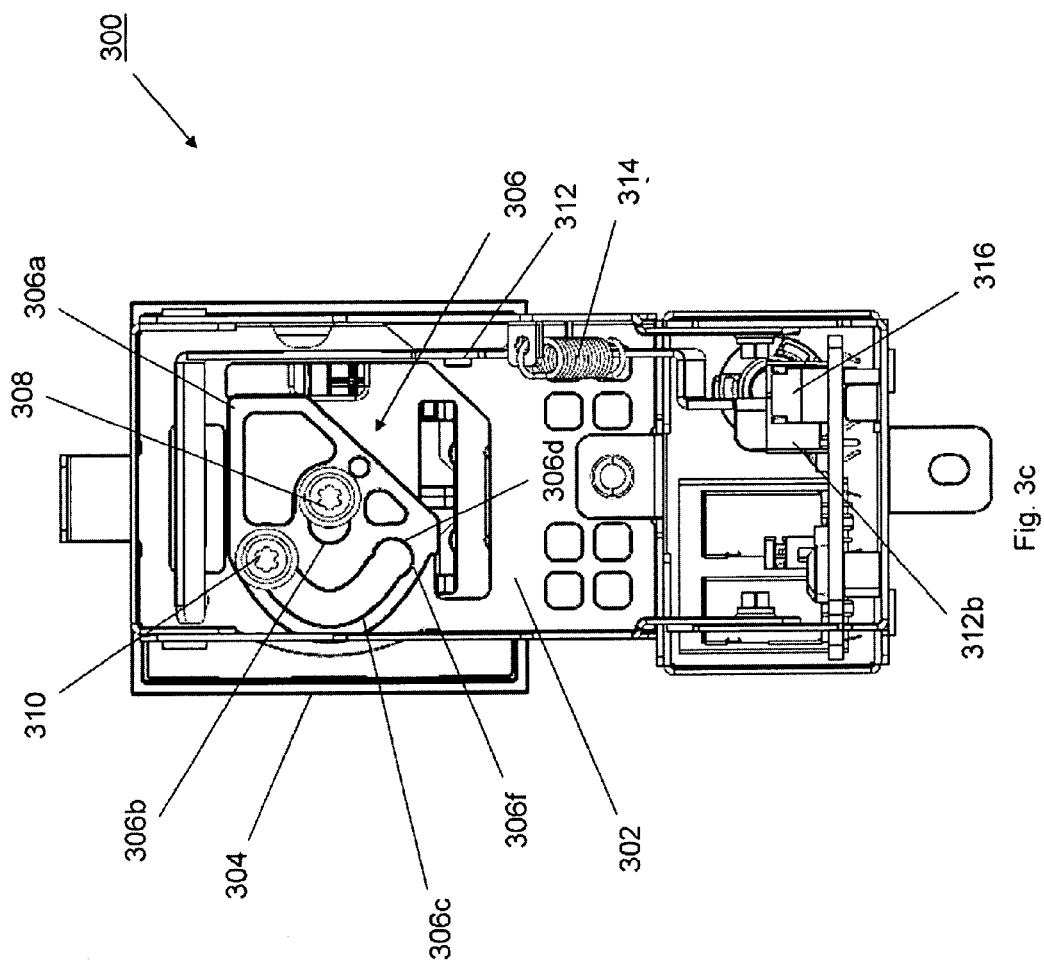

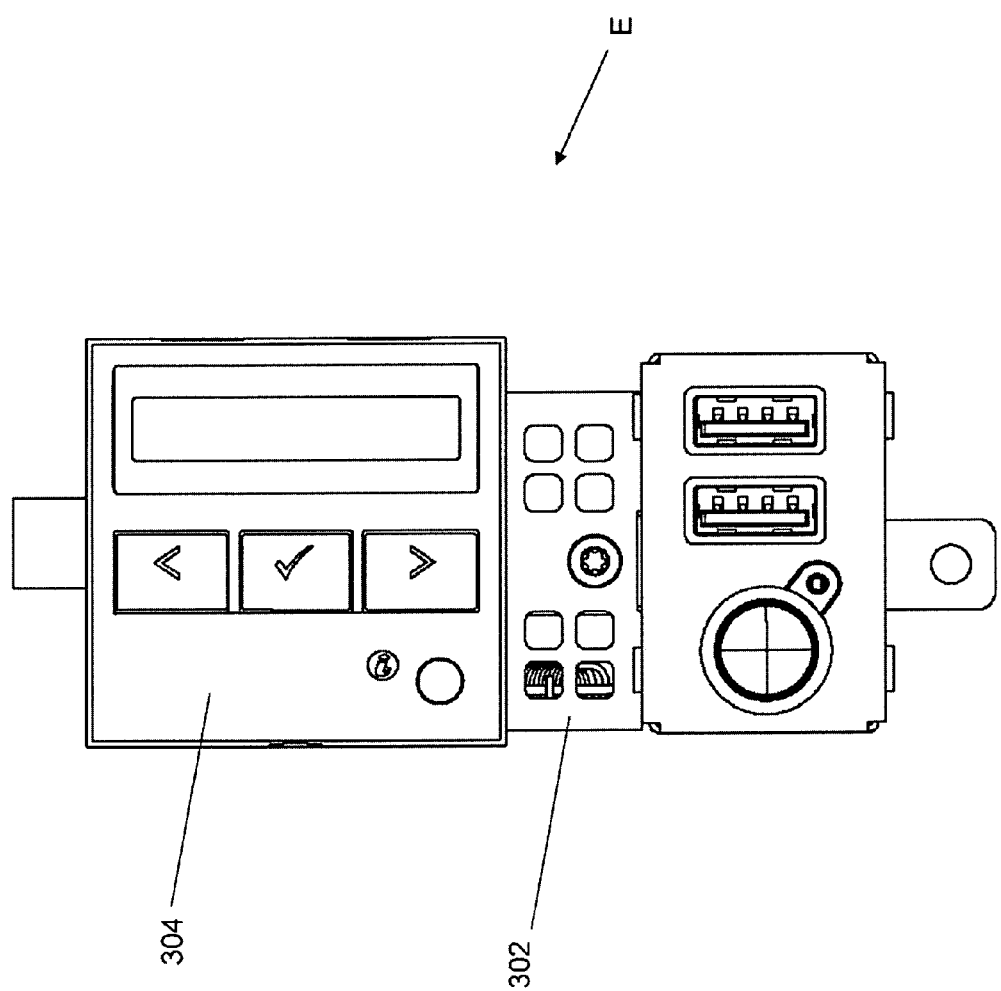

ROTATING AND TRANSLATING CONTROL PANEL

BACKGROUND

The present disclosure relates generally to information handling systems, and more particularly to a rotating and translating control panel on an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs are housed in IHS chassis that may allow a variety of chassis orientations. For example, servers and/or desktop IHSs typically allow both a tower/vertical orientation and a rack/horizontal orientation. However, some of these IHSs include control panels that are at least partially located on an outer surface of the IHS chassis, and the re-orienting of the IHS chassis from one orientation (e.g., tower/vertical) to another (e.g., rack/horizontal) can render the control panel unusable.

One solution to this problem is to include a rotating control panel on the IHS chassis such that, when the IHS chassis is re-oriented, the control panel can be rotated to match the orientation of the chassis (e.g., the control panel may be rotated 90 degrees when the chassis is re-oriented from a vertical to horizontal orientation). However, providing such a control panel raises a number of issues. As the control panel must typically occupy the same space in each of the orientations (e.g., to allow a single bezel to be used for the chassis in both control panel orientations), the control panel is typically a circular shape. However, by limiting the control panel to a circular shape, the size of the control panel is limited. Furthermore, if the control panel includes a non-circular shape (for example, a square shape), the control panel may extend out from a side on the chassis during its re-orientation, which can lead to problems when attempting to reorient the control panel when the chassis is located in a limited space or next to a boundary.

Accordingly, it would be desirable to provide an improved control panel absent the disadvantages discussed above.

SUMMARY

According to one embodiment, a rotating control panel system includes a base, and a control panel coupled to the base by a coupling, wherein the coupling includes a pivot axis including an elongated pivot aperture and a pivot member located in the elongated pivot aperture, wherein the pivot member is operable to rotate relative to the elongated pivot aperture and translate relative to the elongated pivot aperture, and a translation cam including an arcuate translation channel and a translation member located in the arcuate translation channel, wherein in response to the control panel being rotated relative to the base, the pivot member rotates relative to the elongated pivot aperture, and the translation member moves relative to a first portion of the arcuate translation channel to cause the pivot member to translate relative to the elongated pivot aperture in a first direction in order to translate the control panel relative to the base in the first direction, and then moves relative to a second portion of the arcuate translation channel to cause the pivot member to translate relative to the elongated pivot aperture in a second direction in order to translate the control panel relative to the base in the second direction, wherein the second direction is opposite the first direction.

BRIEF DESCRIPTION OF THE DRAWINGS

FIG. 2 is a front view illustrating an embodiment of an IHS chassis in a first chassis orientation.

FIG. 3a is a front view illustrating an embodiment of a control panel system used with the IHS chassis of FIG. 2, with a control panel in a first control panel orientation.

FIG. 3b is a rear perspective view illustrating an embodiment of the control panel system of FIG. 3a.

FIG. 3c is a rear view illustrating an embodiment of the control panel system of FIG. 3a.

FIG. 3d is a partial cross-sectional view illustrating an embodiment of the control panel system of FIG. 3a.

FIG. 4e is a front view illustrating an embodiment of the control panel system of FIGS. 3a, 3b, 3c and 3d with a control panel in a second control panel orientation.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
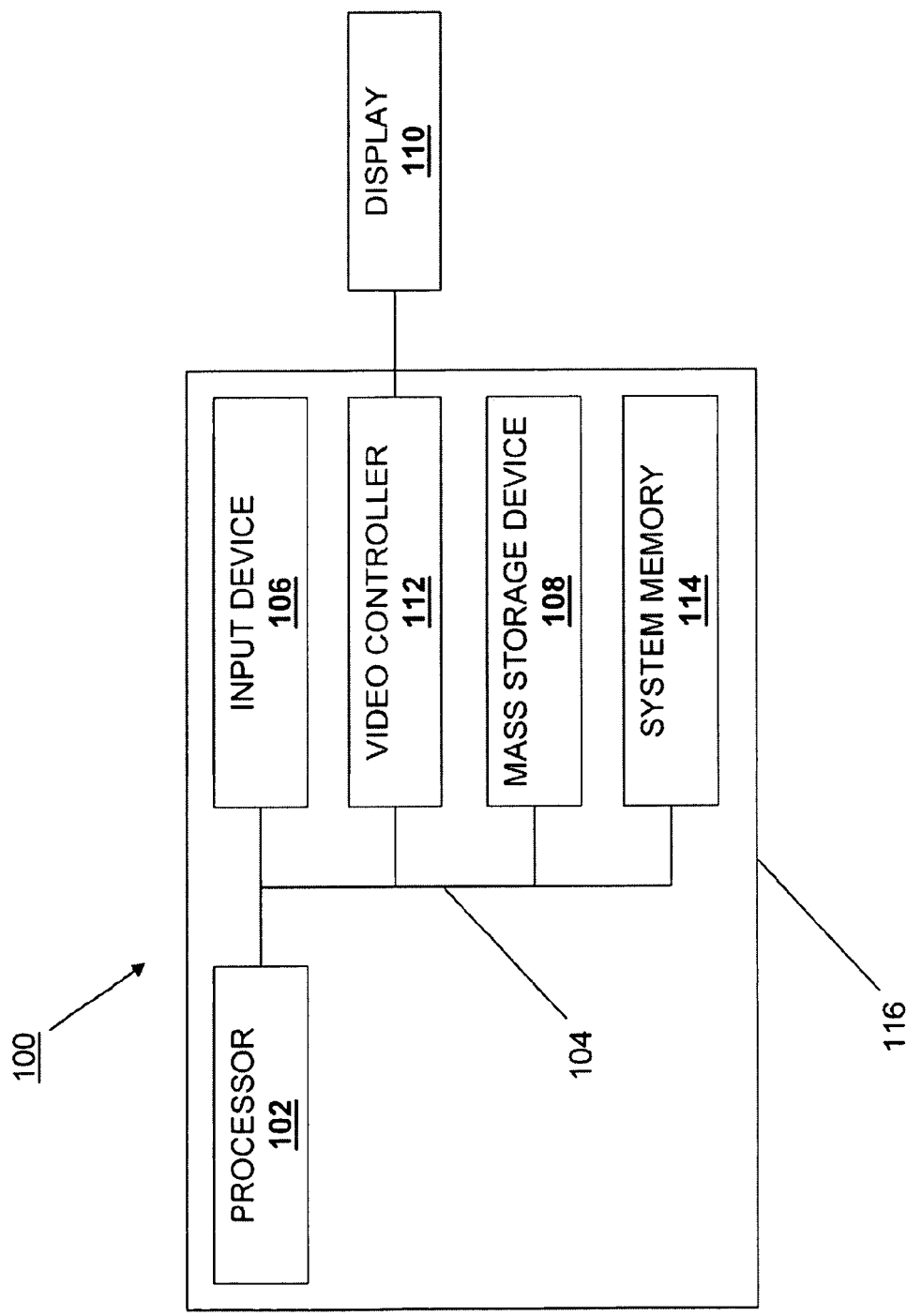
FIG. 1 is a schematic view illustrating an embodiment of an IHS.
Figure 3B:
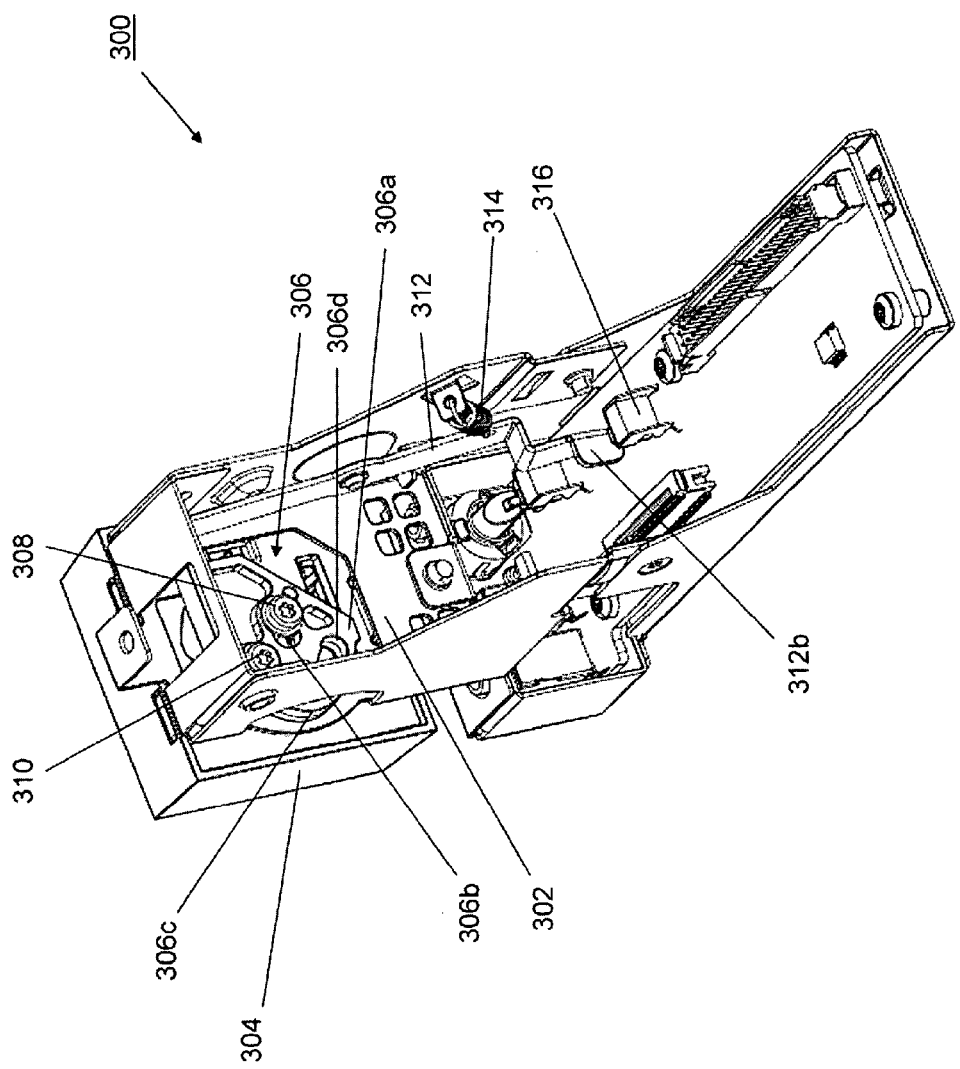
Figure 3D:
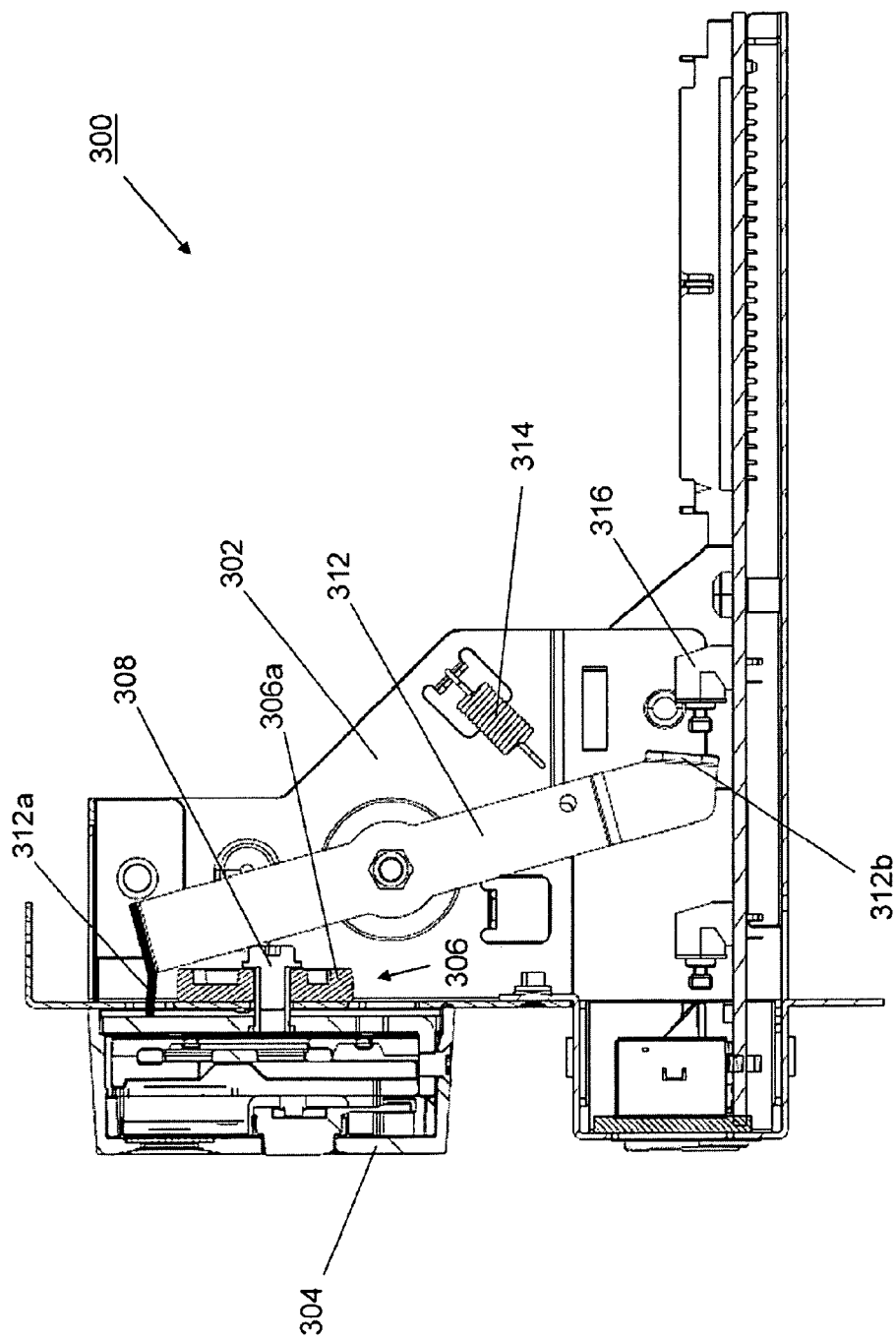

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an IHS chassis 200 is illustrated. In an embodiment, the IHS chassis 200 may be, for example, the chassis 116 described above with reference to FIG. 1 and may house some or all of the components of the IHS 100. The IHS chassis 200 includes a base 202 having a first outer surface 202a, a second outer surface 202b that is oriented substantially perpendicularly to the first outer surface 202a, and an edge 202c that is located between the first outer surface 202a and the second outer surface 202b. In an embodiment, the first outer surface 202a may be located on a bezel that is coupled to the IHS chassis 200 and that defines a control panel aperture 204. In an embodiment, the control panel 304 is of a square shape or other shape chosen to maximize the size of the control panel 304. In an embodiment, the control panel 304 may include buttons, keys, display screens, touch screens, and/or a variety of other input devices in order to provide an interface between a user and the IHS to allow, for example, the user to set up or perform diagnostics on the IHS.

Referring now to FIGS. 2, 3a, 3b, 3c and 3d, a rotating control panel system 300 is illustrated. The rotating control panel system 300 is coupled to the IHS chassis 200 and includes a base 302 and a control panel 304 that is coupled to the base 302 by a coupling 306. In an embodiment, the base 302 is located in the IHS chassis 200 and the control panel 304 is located adjacent the first outer surface 202a of the IHS chassis 200 and in the control panel aperture 204 defined by the bezel. The coupling 306 includes a coupling base 306a that defines an elongated pivot aperture 306b and an arcuate translation channel 306c located adjacent to and spaced apart from the elongated pivot aperture 306. The arcuate translation channel 306c includes a pair of opposing distal ends 306d and 306e (which is obstructed in FIG. 3c, but can be seen in FIG. 4c). A detent 306f is located on the arcuate translation channel 306c adjacent the distal end 306d, and a detent 306g (which is obstructed in FIG. 3c, but can be seen in FIG. 4c) is located on the arcuate translation channel 306c adjacent the distal end 306e. A pivot member 308 is located in the elongated pivot aperture 306b. In an embodiment, the pivot member 308 and the elongated pivot aperture 306b are part of a pivot axis on the rotating control panel system 300. In the illustrated embodiment, the elongated pivot aperture 306b is defined by the base 302 (as the coupling base 306a is part of the base 302), and the pivot member 308 extends from the control panel 304. However, one of skill in the art will recognize that the elongated pivot aperture 306b may be defined by the control panel 308, and the pivot member 308 may extend from the base 302 without departing from the scope of the present disclosure. A translation member 310 is located in the arcuate translation channel 306c. In an embodiment, the translation member 310 and the arcuate translation channel 306c are part of a translation cam on the rotating control panel system 300. In the illustrated embodiment, the arcuate translation channel 306c is defined by the base 302 (as the coupling base 306a is part of the base 302), and the translation member 310 extends from the control panel 304. However, one of skill in the art will recognize that the arcuate translation channel 306a may be defined by the control panel 308, and the translation member 310 may extend from the base 302 without departing from the scope of the present disclosure. An actuation member 312 is pivotally coupled to the base 302 and includes a first end 312a that is coupled to the coupling 306. A spring 314 extends between the base 302 and the actuation member 312 in order to resiliently bias a second end 312b of the actuation member 312 such that the second end 312b is spaced apart from an switch 316 that extends from the base 302.

Referring now to FIGS. 2, 4a, 4b, 4c, 4d, 4e, 4f and 4g, a method 400 for orienting a control panel on a chassis is illustrated. The method 400 begins at block 402 where a chassis with a control panel is provided. In an embodiment, the IHS chassis 200 including the control panel system 300 is provided located on/adjacent a surface/structure 402a. The method 400 then proceeds to block 404 where the orientation of the chassis is changed. In an embodiment, the IHS chassis 200 may be oriented in an first chassis orientation A, illustrated in FIG. 2, which may be referred to as a vertical orientation or a tower orientation. One of skill in the art will recognize that such a chassis may have its orientation changed to, for example, a horizontal orientation or rack orientation, by rotating the IHS chassis 200 ninety degrees from the orientation A and positioning the IHS chassis 200 on a surface or in a rack. However, simply rotating the IHS chassis 200 ninety degrees from the first chassis orientation A will rotate the control panel 304 as well, providing a difficult to use 'sideways' orientation of the control panel 304. Furthermore, as can be seen from FIG. 2, by rotating the IHS chassis 200 ninety degrees counterclockwise from the first chassis orientation A, the second outer surface 202b and edge 202c will be located immediately adjacent the surface/structure 402a. In an embodiment, at block 404 of the method 400, the bezel that includes the first outer surface 202a and defines the control panel aperture 204 may be removed, and the IHS chassis 200 may be rotated ninety degrees counterclockwise from the first chassis orientation A such that the second outer surface 202b and edge 202c are located immediately adjacent the surface/structure 402a (e.g., during assembly of the IHS).

The method 400 then proceeds to block 406 where the control panel is rotated from a first orientation to a second orientation. The control panel 304 begins in an first control panel orientation B, illustrated in FIGS. 2 and 3a. The detent 306g located on the distal end 306e of the arcuate translation channel 306c works to hold the translation member 310 adjacent the distal end 306e of the arcuate translation channel 306c when no rotation force is applied to the control panel 304. In an embodiment, a rotation force may be applied to the control panel 304 such that the control panel 304 is rotated clockwise relative to the base 302 from the first control panel orientation B illustrated in FIG. 3a, causing the translation member 310 to be urged out of the detent 306g and move relative to the arcuate translation channel 306c. The movement of translation member 310 relative to the arcuate translation channel 306c and through a first portion of the arcuate translation channel 306c (which, in the illustrated embodiment, is from the position immediately adjacent the distal end 306e shown in FIG. 3c to the position midway between the distal ends 306e and 306d illustrated in FIG. 4c) causes the pivot member 308 to rotate relative to the elongated pivot aperture 306b while also translating relative to the elongated pivot aperture 306b in a direction C, as illustrated in FIGS. 4c and 4d. When the translation member 310 is at the end of the first portion of the arcuate translation channel 306c, illustrated in FIG. 4c, the control panel 304 is oriented in an intermediate orientation D, illustrated in FIGS. 4b, 4c and 4d. As can be seen in FIG. 4d, the translation of the control panel 304 in the direction C ensures that the control panel 304 does not cross the edge 202c of the IHS chassis 200 (i.e., in an embodiment, the control panel 304 is translated away from the edge 202c during its rotation such that no portion of the control panel 304 breaks a plane that extends from the second outer surface 202b and out of the page in FIG. 4d). By translating the control panel 304 in such a manner, the control panel 304 may be rotated when, for example, there is a surface/structure (e.g., the surface/structure 402a) located immediately adjacent the second outer surface 202b and/or the edge 202 that would otherwise prevent the rotation of the control panel 304 (e.g., a surface that the IHS chassis 200 is positioned on during assembly or another IHS chassis located in a rack immediately adjacent the IHS chassis 200). Furthermore, by translating the control panel 304 in such a manner, the shape of the control panel 304 is not limited (e.g., to a circular shape) thereby allowing the size of the control panel 304 to be maximized.

Figure 4A:
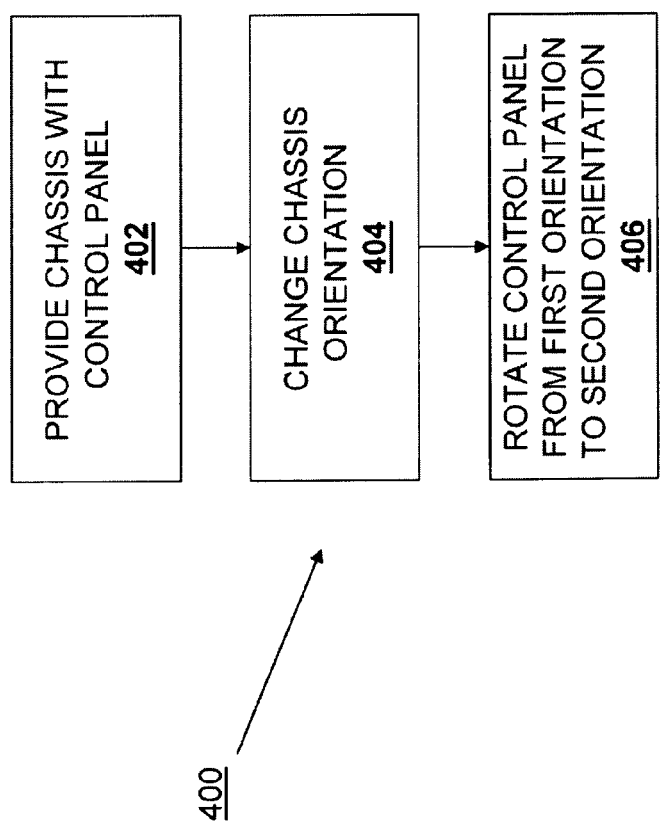
FIG. 4a is a flow chart illustrating an embodiment of a method for orienting a control panel on a chassis.
Figure 4B:
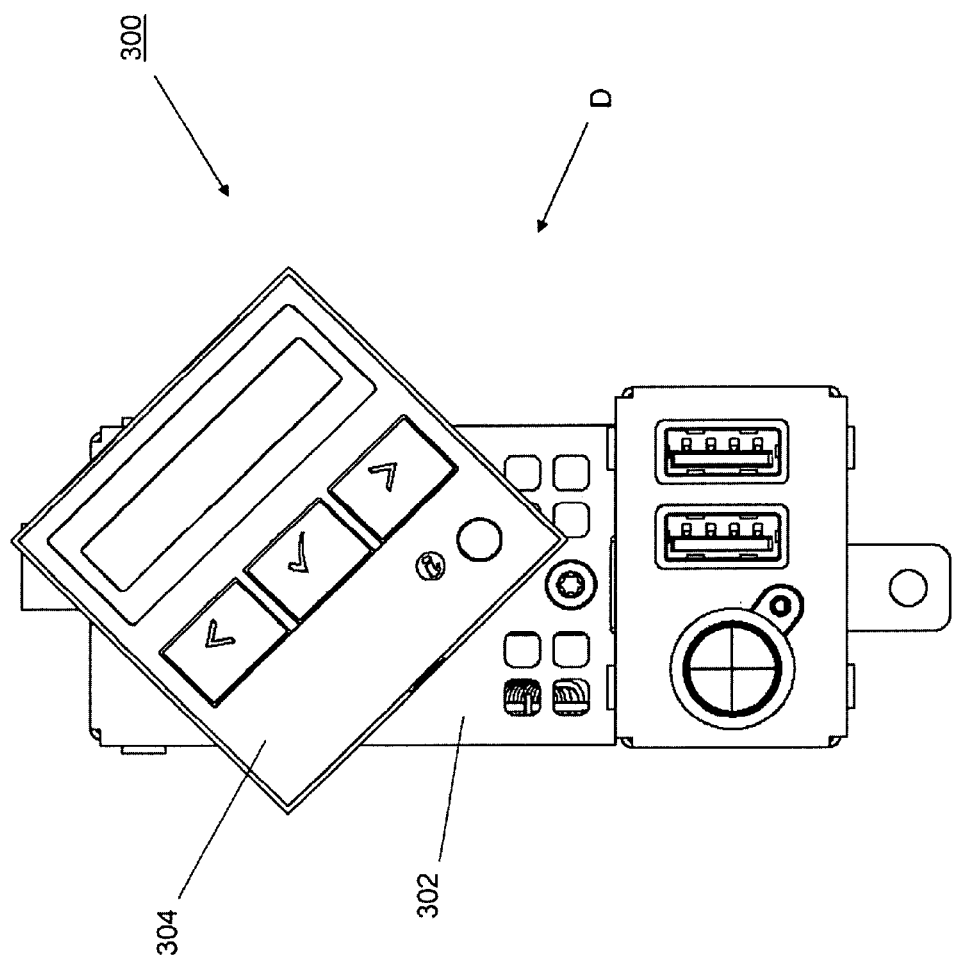
FIG. 4b is a front view illustrating an embodiment of the control panel system of FIGS. 3a, 3b, 3c and 3d with a control panel in an intermediate control panel orientation.
Figure 4C:
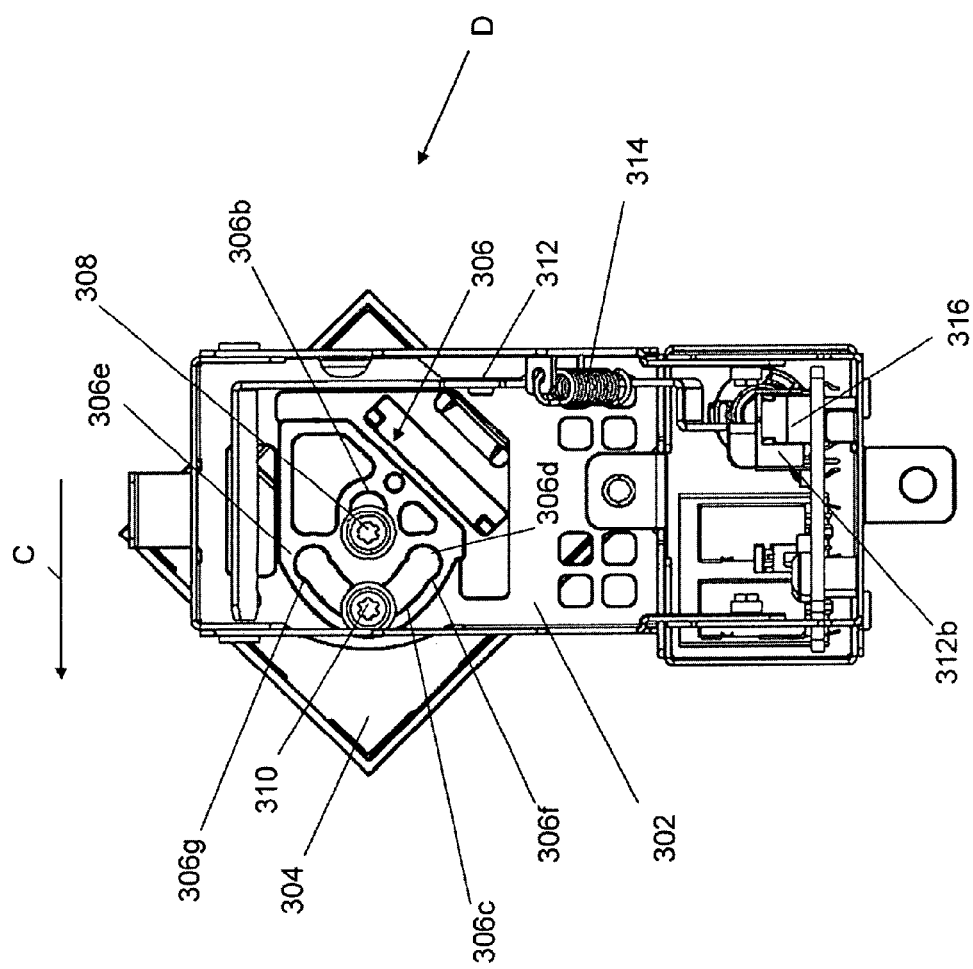
FIG. 4c is a rear view illustrating an embodiment of the control panel system of FIGS. 3a, 3b, 3c and 3d with a control panel in an intermediate control panel orientation.
Figure 4D:
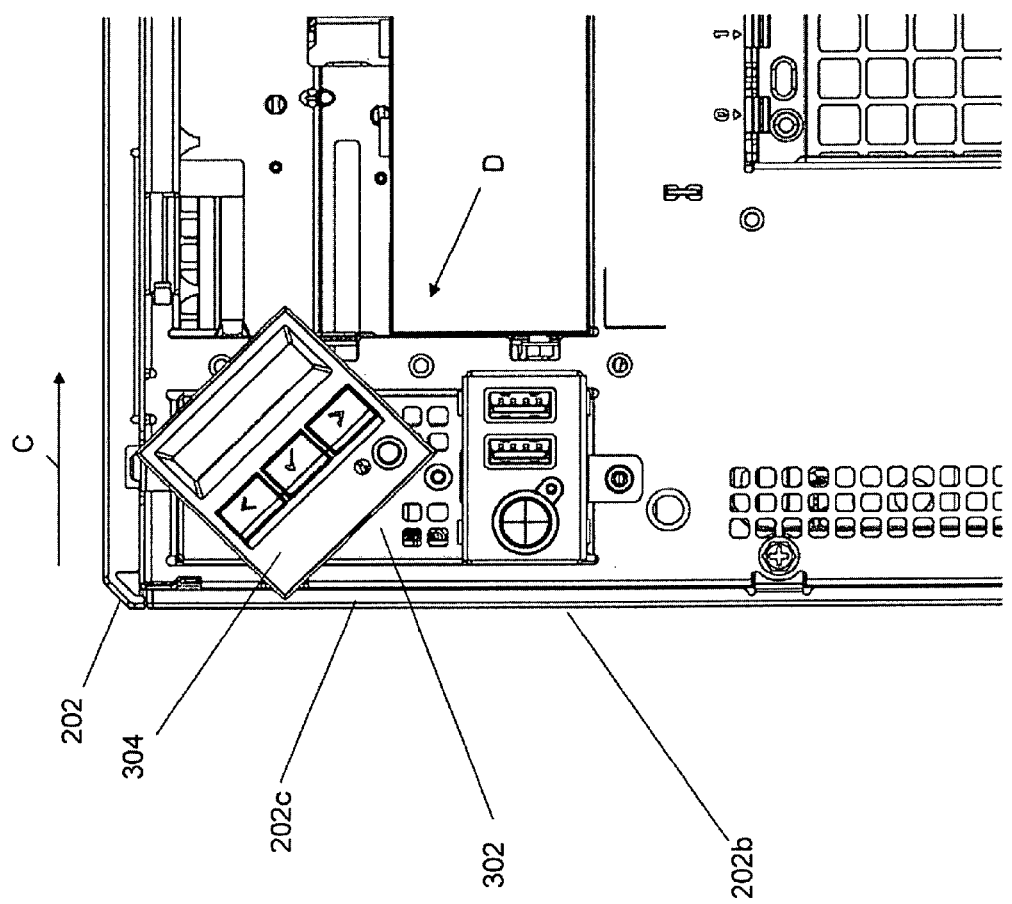
FIG. 4d is a front view illustrating an embodiment of the control panel system of FIGS. 3a, 3b, 3c and 3d on the IHS chassis of FIG. 2 with a control panel in an intermediate control panel orientation.
Figure 4F:
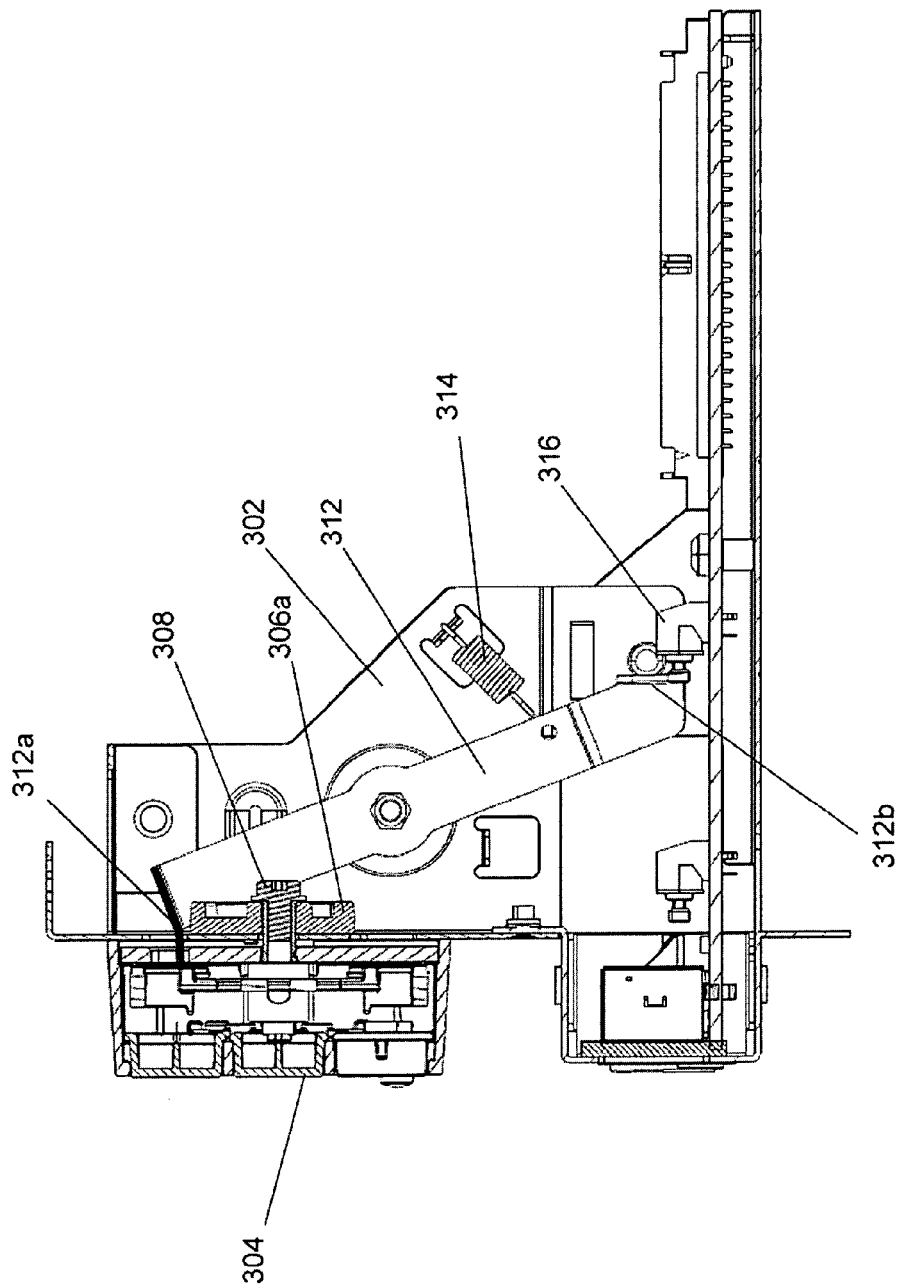
FIG. 4f is a partial cross-sectional view illustrating an embodiment of the control panel system of FIGS. 3a, 3b, 3c and 3d with a control panel in a second control panel orientation.
Figure 4G:
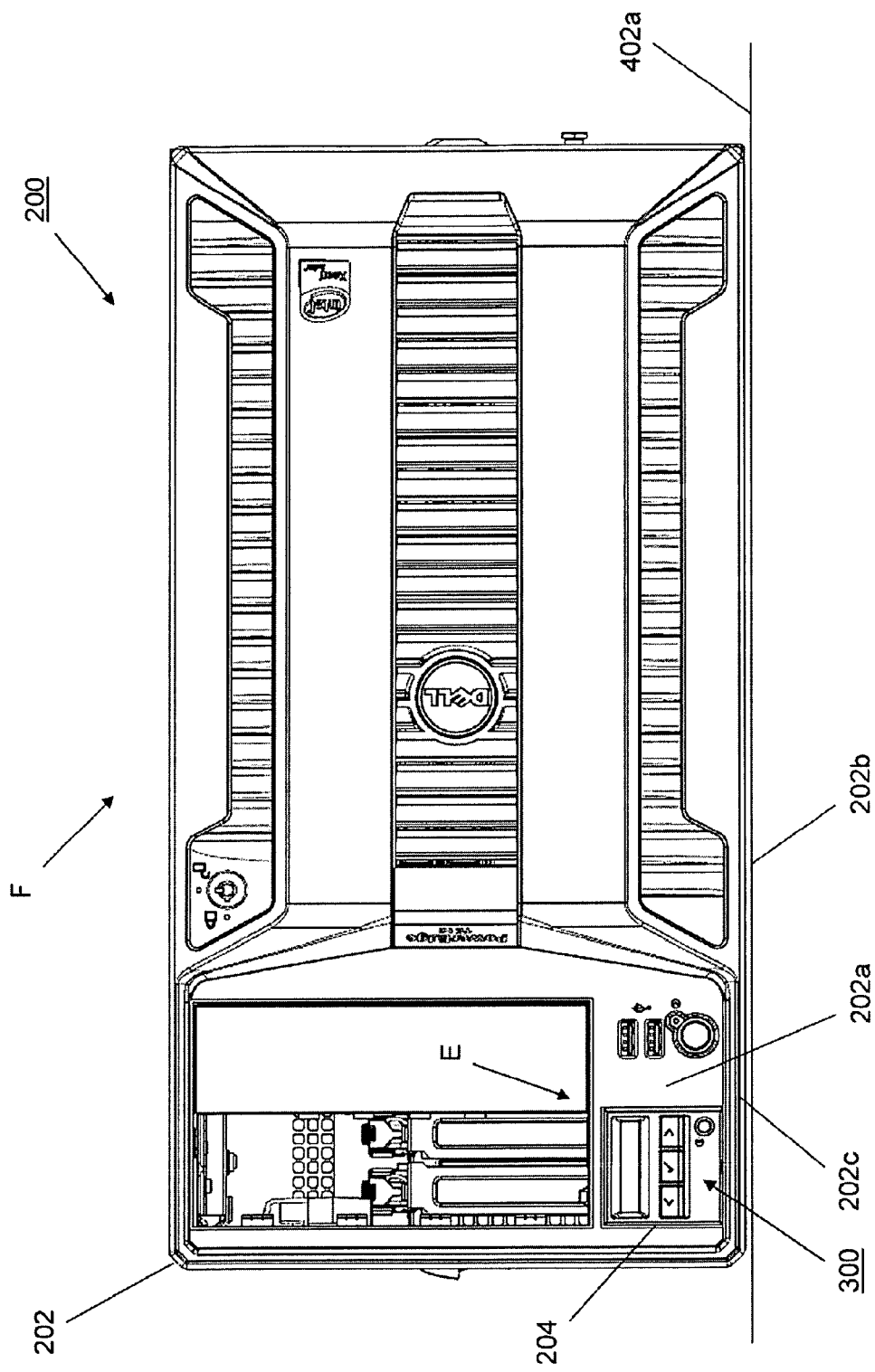
FIG. 4g is a front view illustrating an embodiment of the IHS chassis of FIG. 2 in a second chassis orientation with the control panel system of FIGS. 3a, 3b, 3c and 3d in a second control panel orientation.

Once the translation member 310 has moved through the first portion of the arcuate translation channel 306c, continued rotation of the control panel 304 relative to the base 302 will cause the translation member 310 to move through a second portion of the arcuate translation channel 306c (which, in the illustrated embodiment, is from the position midway between the distal ends 306e and 306d shown in FIG. 4c to a position immediately adjacent the distal end 306d). Movement of the translation member 310 through the second portion of the arcuate translation channel 306c causes the pivot member 308 to rotate relative to the elongated pivot aperture 306b while also translating relative to the elongated pivot aperture 306b in a direction that is opposite the direction C. When the translation member 310 is at the end of the second portion of the arcuate translation channel 306c, the control panel 304 is oriented in an second control panel orientation E, illustrated in FIGS. 4e and 4g, and the translation member 310 will be located in the detent 306f that is located on the distal end 306d of the arcuate translation channel 306c. The detent 306f works to hold the translation member 310 adjacent the distal end 306d of the arcuate translation channel 306c when no rotation force is applied to the control panel 304. Furthermore, due to the coupling of the first end 312a of the actuation member 312 and the coupling 306, the rotation of the control panel 304 relative to the base 302 causes the actuation member 312 to pivot relative to the base 302 such that the second end 312b of the actuation member 312 moves relative to the switch 316 from the spaced apart orientation illustrated in FIG. 3d to an actuating orientation illustrated in FIG. 4f that results in the second end 312b of the actuation member 312 engaging the switch 316. In an embodiment, engagement of the actuation member 312 and the switch 316 may activate an indicator on the IHS chassis 200 that indicates, for example, that the control panel has switched orientation. However, one of skill in the art will recognize a number of different results that may be enabled due to the activation of the switch 316. As can be seen in FIG. 4g, the control panel 304 in the second control panel orientation E provides an easier orientation for using the control panel 304 when the chassis 200 has been moved from the first chassis orientation A to a second chassis orientation F, which may be referred to as a horizontal orientation or a rack orientation. Thus, a system and method have been provided that allow a control panel orientation to be changed in response to a change in chassis orientation when the control panel is located adjacent an edge of the chassis and that edge is located immediately adjacent a surface or structure, while also allowing the size of the control panel to be maximized.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A rotating control panel system, comprising:
   a base; and
   a control panel coupled to the base by a coupling, wherein the coupling comprises:
      a pivot axis comprising an elongated pivot aperture and a pivot member located in the elongated pivot aperture, wherein the pivot member is operable to rotate relative to the elongated pivot aperture and translate relative to the elongated pivot aperture; and
      a translation cam comprising an arcuate translation channel and a translation member located in the arcuate translation channel, wherein in response to the control panel being rotated relative to the base, the pivot member rotates relative to the elongated pivot aperture, and the translation member moves relative to a first portion of the arcuate translation channel to cause the pivot member to translate relative to the elongated pivot aperture in a first direction in order to translate the control panel relative to the base in the first direction, and then moves relative to a second portion of the arcuate translation channel to cause the pivot member to translate relative to the elongated pivot aperture in a second direction in order to translate the control panel relative to the base in the second direction, wherein the second direction is opposite the first direction.

2. The system of claim 1, further comprising:
   a pair of opposing distal ends on the arcuate translation channel, wherein the pivot member is located in substantially the same position relative to the elongated pivot aperture when the translation member is located at either of the opposing distal ends.

3. The system of claim 1, further comprising:
   at least one detent located on the arcuate translation channel, wherein the translation member is operable to engage the at least one detent.

4. The system of claim 1, further comprising:
   a switch coupled to the control panel such that, in response to rotating the control panel from a first orientation to a second orientation, the switch is activated.

5. The system of claim 1, further comprising:
   a chassis comprising an outer surface and an edge located adjacent the outer surface, wherein the base is located in the chassis and the control panel is located adjacent the edge of the chassis, and wherein the translation of the control panel relative to the base in the first direction during rotation of the control panel prevents the control panel from crossing the edge.

6. The system of claim 1, wherein the elongated pivot aperture and the arcuate translation channel are defined by the base, and the pivot member and the translation member extend from the control panel.

7. The system of claim 1, wherein the elongated pivot aperture and the arcuate translation channel are defined by the control panel, and the pivot member and the translation member extend from the base.

8. The system of claim 1, wherein the arcuate translation channel comprises a first distal end and second distal end located opposite the arcuate translation channel from the first distal end, and wherein with the translation member located at the first distal end, the control panel is in a first orientation, and with the translation member located at the second distal end, the control panel is in a second orientation that is rotated substantially ninety degrees from the first orientation.

9. An information handling system, comprising:
a chassis;
a processor located in the chassis;
a control panel located adjacent an edge of the chassis and coupled to the chassis by a coupling, wherein the coupling comprises:
a pivot axis comprising an elongated pivot aperture and a pivot member located in the elongated pivot aperture, wherein the pivot member is operable to rotate relative to the elongated pivot aperture and translate relative to the elongated pivot aperture; and
a translation cam comprising an arcuate translation channel and a translation member located in the arcuate translation channel, wherein in response to the control panel being rotated relative to the chassis, the pivot member rotates relative to the elongated pivot aperture, and the translation member moves relative to a first portion of the arcuate translation channel to cause the pivot member to translate relative to the elongated pivot aperture in a first direction in order to translate the control panel relative to the chassis in the first direction, and then moves relative to a second portion of the arcuate translation channel to cause the pivot member to translate relative to the elongated pivot aperture in a second direction in order to translate the control panel relative to the chassis in the second direction, wherein the second direction is opposite the first direction.

10. The system of claim 9, further comprising:
a pair of opposing distal ends on the arcuate translation channel, wherein the pivot member is located in substantially the same position relative to in the elongated pivot aperture when the translation member is located at either of the opposing distal ends.

11. The system of claim 9, further comprising:
at least one detent located on the arcuate translation channel, wherein the translation member is operable to engage the at least one detent.

12. The system of claim 9, further comprising:
a switch coupled to the control panel such that, in response to rotating the control panel from a first orientation to a second orientation, the switch is activated.

13. The system of claim 9, wherein the translation of the control panel relative to the chassis in the first direction during rotation of the control panel prevents the control panel from crossing the edge.

14. The system of claim 9, wherein the elongated pivot aperture and the arcuate translation channel are defined by the chassis, and the pivot member and the translation member extend from the control panel.

15. The system of claim 9, wherein the elongated pivot aperture and the arcuate translation channel are defined by the control panel, and the pivot member and the translation member extend from the chassis.

16. The system of claim 9, wherein the arcuate translation channel comprises a first distal end and second distal end located opposite the arcuate translation channel from the first distal end, and wherein with the translation member located at the first distal end, the control panel is in a first orientation, and with the translation member located at the second distal end, the control panel is in a second orientation that is rotated substantially ninety degrees from the first orientation.

17. A method for orienting a control panel on a chassis, comprising:
providing a chassis comprising a control panel, wherein the chassis is positionable in a plurality of orientations;
switching the orientation of the chassis from a first chassis orientation to a second chassis orientation; and
rotating the control panel relative to the chassis from a first control panel orientation to a second control panel orientation, wherein the rotating the control panel comprises:
rotating a pivot member that is coupled to the control panel relative to an elongated pivot aperture that is coupled to the pivot member;
moving a translation member that is coupled to the control panel relative to a first portion of a translation channel that is coupled to the translation member and, in response, causing the pivot member to translate relative to the elongated pivot aperture in a first direction in order to translate the control panel in the first direction; and
moving the translation member relative to a second portion of the translation channel and, in response, causing the pivot member to translate relative to the elongated pivot aperture in a second direction in order to translate the control panel in the second direction, wherein the second direction is opposite the first direction.

18. The method of claim 17, further comprising:
engaging a detent located on the arcuate translation channel with the translation member.

19. The method of claim 17, further comprising:
activating a switch in response to rotating the control panel.

20. The method of claim 17, wherein the control panel is located adjacent an edge of the chassis, and wherein the translation of the control panel relative to the chassis in the first direction during rotation of the control panel prevents the control panel from crossing the edge.

* * * * *

UNITED STATES PATENT AND TRADEMARK OFFICE
CERTIFICATE OF CORRECTION

| | | |
|---|---|---|
| PATENT NO. | : 7,643,303 B1 | Page 1 of 1 |
| APPLICATION NO. | : 12/363105 | |
| DATED | : January 5, 2010 | |
| INVENTOR(S) | : Raymond DeWine Heistand, II et al. | |

It is certified that error appears in the above-identified patent and that said Letters Patent is hereby corrected as shown below:

Claim 9, Column 7, Line 25, after chassis; insert --and--.

Signed and Sealed this

Sixteenth Day of March, 2010

David J. Kappos
*Director of the United States Patent and Trademark Office*